United States Patent
Parthasarathy et al.

(10) Patent No.: US 10,423,767 B2
(45) Date of Patent: Sep. 24, 2019

(54) CONTENT PROTECTION SYSTEM USING BIOMETRIC AUTHENTICATION

(71) Applicant: Intel Corporation, Santa Clara, CA (US)

(72) Inventors: Sailaja Parthasarathy, Bangalore (IN); Akshay Vashishtha, Bangalore (IN); Vignesh T Prabhu, Bangalore (IN); Rasik Krishna, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 123 days.

(21) Appl. No.: 15/100,554

(22) PCT Filed: Nov. 25, 2014

(86) PCT No.: PCT/US2014/067316
§ 371 (c)(1),
(2) Date: May 31, 2016

(87) PCT Pub. No.: WO2015/099938
PCT Pub. Date: Jul. 2, 2015

(65) Prior Publication Data
US 2016/0300051 A1    Oct. 13, 2016

(30) Foreign Application Priority Data
Dec. 27, 2013    (IN) ............................. 6128/CHE/2013

(51) Int. Cl.
*G06F 21/32* (2013.01)
*G06F 21/10* (2013.01)

(52) U.S. Cl.
CPC .............. *G06F 21/32* (2013.01); *G06F 21/10* (2013.01)

(58) Field of Classification Search
CPC .................................. G06F 21/32; G06F 21/10
See application file for complete search history.

(56) References Cited

U.S. PATENT DOCUMENTS 8,234,697 B2 * 7/2012 Chhabra ............. G06F 9/44526
                                                     709/225
2004/0257196 A1 * 12/2004 Kotzin ............... G07C 9/00142
                                                     340/5.52
(Continued)

FOREIGN PATENT DOCUMENTS

WO     2004090667 A2    10/2004

OTHER PUBLICATIONS

International Search Report and Written Opinion received for PCT Application No. PCT/US2014/067316, dated Feb. 16, 2015, 12 pages.

(Continued)

*Primary Examiner* — Catherine Thiaw
(74) *Attorney, Agent, or Firm* — Grossman, Tucker, Perreault & Pfleger, PLLC

(57) ABSTRACT

The present disclosure is directed to a content protection system using biometric authentication. In general, a user may be authenticated using sensed biometric data prior to receiving content from a content provider. An example device may comprise a biometric identification (BI) module and a content delivery (CD) module. The CD module may cause the BI module to sense biometric data from a user of the device. Authentication data may be generated based on the biometric data. In one embodiment, the authentication data may comprise a key generated from the biometric data. The authentication data may then be sent to the content provider, and upon authentication, the content provider may deliver the content to the device. The CD module may also be able to register new users with the content provider and/or allow users to purchase content not already licensed to the user.

23 Claims, 4 Drawing Sheets

(56) References Cited

U.S. PATENT DOCUMENTS

| | | |
|---|---|---|
| 2006/0143441 A1 | 6/2006 | Giobbi |
| 2006/0288238 A1* | 12/2006 | Ray .................. G06F 21/10 713/193 |
| 2007/0288320 A1* | 12/2007 | Cooper ............ G06Q 10/067 705/348 |
| 2009/0113529 A1 | 4/2009 | Siegel et al. |
| 2010/0232653 A1 | 9/2010 | Muquit et al. |
| 2011/0035788 A1* | 2/2011 | White ................ G06F 21/32 726/4 |
| 2011/0126024 A1* | 5/2011 | Beatson ............ G06F 21/32 713/186 |
| 2011/0219229 A1* | 9/2011 | Cholas .............. G06F 21/00 713/168 |
| 2012/0159600 A1* | 6/2012 | Takagi .............. G06F 21/32 726/7 |
| 2013/0013931 A1* | 1/2013 | O'Hare ............ H04L 9/0822 713/189 |
| 2013/0160111 A1 | 6/2013 | Orr |
| 2014/0012749 A1* | 1/2014 | Lee .................. G06Q 20/367 705/40 |
| 2014/0095870 A1* | 4/2014 | Dewan ............ H04L 9/0866 713/167 |
| 2014/0101434 A1* | 4/2014 | Senthurpandi ...... G06F 12/1408 713/150 |
| 2014/0189828 A1* | 7/2014 | Baghdasaryan .... H04L 63/0861 726/6 |
| 2014/0281567 A1* | 9/2014 | Rane ................ G06F 21/32 713/186 |
| 2017/0039368 A1* | 2/2017 | Grobman ............ G06F 21/31 |

OTHER PUBLICATIONS

International Preliminary Report on Patentability received for PCT Application No. PCT/US2014/067316, dated Jul. 7, 2016, 9 pages.

* cited by examiner

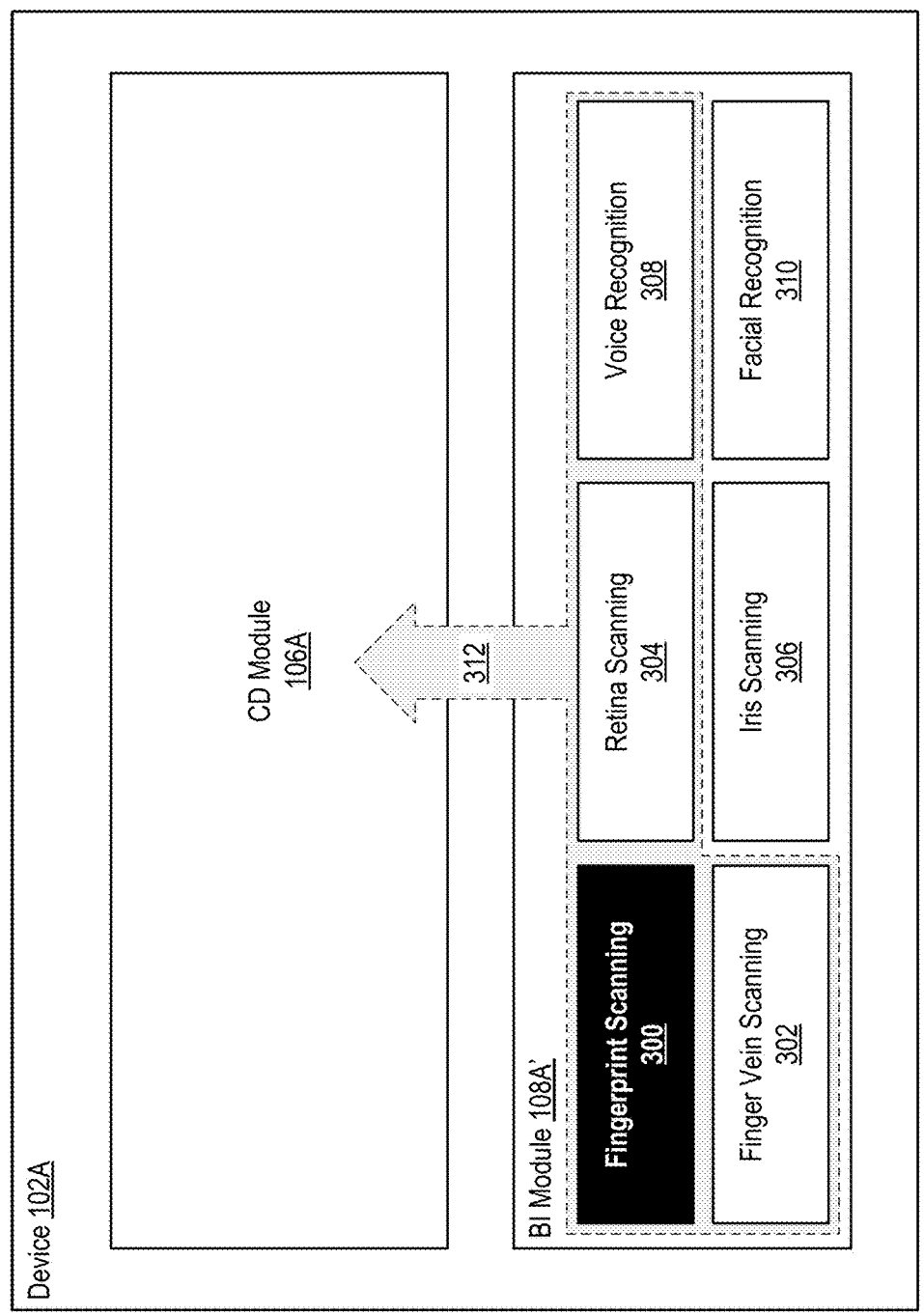

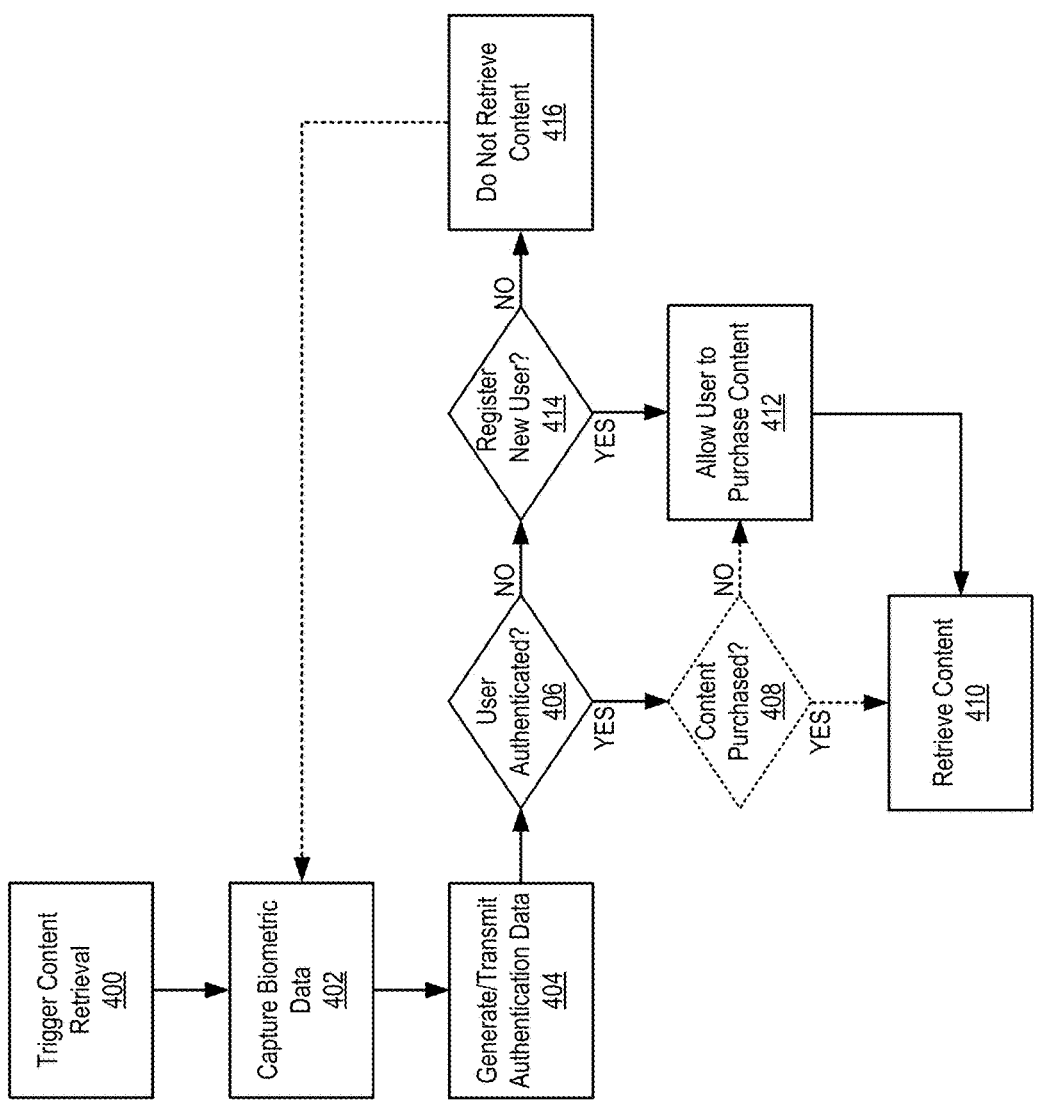

CONTENT PROTECTION SYSTEM USING BIOMETRIC AUTHENTICATION

TECHNICAL FIELD

The present disclosure relates to content protection systems, and more particularly, to a scheme for safely delivering content to users authenticated based at least on biometric data.

BACKGROUND

Advancements in electronic communication have resulted in the ability to deliver data to different types of devices in a variety of environments. For example, content providers are now able to provide content to typically stationary viewing and/or computing devices, mobile devices, etc. Content may comprise, for example, multimedia data (e.g., text, audio, images, video, or combinations thereof). While the ability to consume content may be very attractive to device users, there may be some apprehension for content providers to make their content available in certain situations. For example, the content providers may employ digital rights management (DRM) to ensure that their content is only consumed by entitled users (e.g., the users that have purchased a copy of the content or at least purchased the right to consume the content on a limited basis). DRM was more straightforward when physical media was used to deliver the content, however, the advent of consumption via wired or wireless electronic delivery has made protecting the rights of content owners somewhat more problematic.

For example, simple username/password authentication may readily be circumvented by unlicensed users. More secure DRM schemes may attempt to improve security by linking the right to consume to a more permanent fixture, such as a device identification provided by a hardware-based (e.g., firmware) or secure software-based source. These DRM systems rely upon the permanence of device-based identifications that cannot be duplicated, impersonated, etc. However, since the license is linked to the purchasing device, the actual consumption of the content is also bound to the purchasing device. This limitation may eliminate the ability for rightful users to consume licensed content on various other devices (e.g., mobile devices). The inability to consume licensed content on other devices may render the device-ID based content delivery model unattractive to users, and thus, unprofitable for content providers.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates an example of interaction between a content delivery (CD) module and biometric identification (BI) module in accordance with at least one embodiment of the present disclosure; and FIG. 4 illustrates example operations for a content protection system using biometric identification in accordance with at least one embodiment of the present disclosure.

Figure 1:
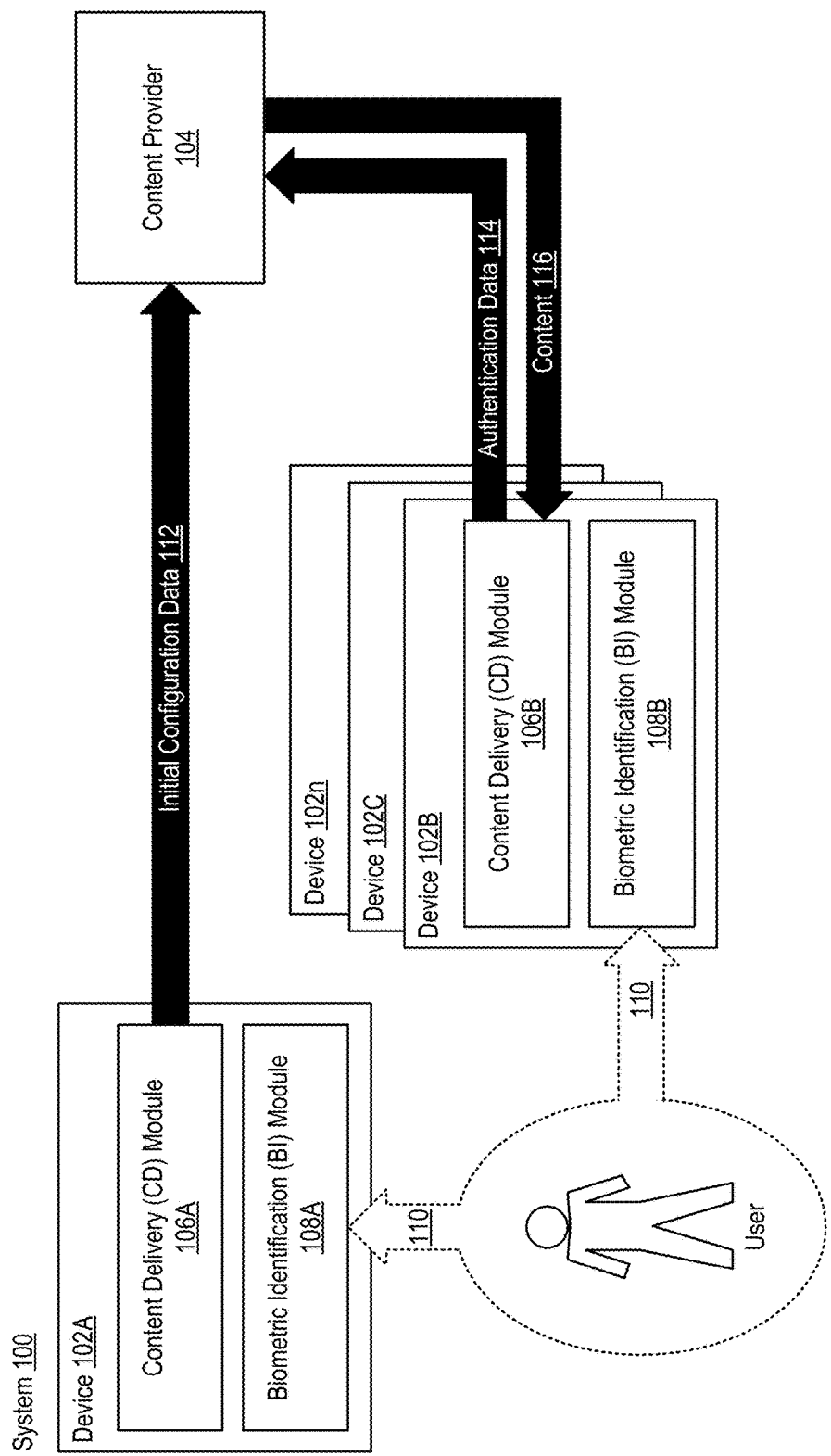
FIG. 1 illustrates an example content protection system using biometric authentication in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a content protection system using biometric authentication. In general, a user may be authenticated using sensed biometric data prior to receiving content from a content provider. A device may comprise, for example, a biometric identification (BI) module and a content delivery (CD) module. Upon receiving a request to retrieve content, the CD module may cause the BI module to sense biometric data from a user of the device. Authentication data may then be generated based on the biometric data. In one embodiment, the authentication data may comprise at least a key generated from the biometric information. The authentication data may then be sent to the content provider, and upon authentication, the content provider may deliver the content to the device. In some implementations, the CD module may register the biometric data sensed from new users with the content provider and/or allow users to purchase content not already licensed to the user.

In one embodiment, a device configured for use in a content protection system may comprise, for example, at least a communication module, a BI module and an HD module. The communication module may be to at least transmit authentication data to, and receive content from, a content provider. The BI module may be to sense biometric data. The CD module may be to cause the BI module to sense the biometric data from a user in response to a request to retrieve the content from the content provider, to generate the authentication data based on the biometric data, to cause the communication module to transmit the authentication data to the content provider for authentication and to receive the content from the content provider via the communication module based on the authentication.

In one example implementation, the content provider may be outside of the device, the content provider comprising at least one computing device accessible via a wide-area network. The BI module may be internal to the device or at least coupled to the device via the communication module. The CD module may comprise at least one application verified as safe by a trusted execution environment (TEE) in the device, the TEE including at least a secure memory space accessible to only applications verified as safe by the TEE.

The CD module may further be to determine biometric sensors that are available in association with the BI module. In this instance, the CD module may then further be to determine at least one preferred biometric sensor for use with the content provider based on the biometric sensors that were determined to be available in association with the BI module. The CD module being to generate the authentication data may comprise the CD module being to generate a key for authenticating a user of the device based on the biometric data, the authentication data including at least the key.

In the same or another embodiment, the CD module may further be to determine if the user is registered with the content provider, if it is determined that the user is not registered with the content provider, to cause the content provider to register the user based on the authentication data.

The CD module being to cause the content provider to register the user based on the authentication data may comprise the CD module being to cause the content provider to associate the authentication data with data identifying the device or replace the data identifying the device with the authentication data. The CD module may further be to determine if the user has purchased the content, if it is determined that the user has not purchased the content, to provide a user interface in the device allowing the user to purchase the content and to cause the content provider to associate the authentication data with the purchased content. A method for content protection consistent with the present disclosure may comprise, for example, causing biometric data to be sensed from a user by a device in response to a request to retrieve content from a content provider, generating authentication data based on the biometric data, causing the authentication data to be transmitted from the device to the content provider for authentication and receiving the content at the device from the content provider based on the authentication.

FIG. 1 illustrates an example content protection system using biometric authentication in accordance with at least one embodiment of the present disclosure. Example system 100 may comprise device 102A, device 102B, device 102C . . . device 102n (collectively, "devices 102A . . . n") and content provider 104. The actual number of devices 102A . . . n is not limited to those illustrated in FIG. 1, and thus, may vary depending on the particular implementation. Examples of devices 102A . . . n may comprise, but are not limited to, a mobile communication device such as a cellular handset or a smartphone based on the Android® OS, iOS®, Windows® OS, Mac® OS, Tizen® OS, Firefox® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a server, a smart television, a small form factor computer (e.g., for space-limited applications, television-top boxes, etc.) like the Next Unit of Computing (NUC) platform from the Intel Corporation, etc.

Content provider 104 may comprise at least one computing device accessible via a local-area network (LAN) or wide-area network (WAN). For example, content provider 104 may include at least one server organized in a cloud-computing configuration. It is important to note that content provider 104 may not be the same entity that originally generated content 116 (e.g., multimedia data including text, images, video and/or audio). For example, content provider 104 may be a third-party that sells content 116 or licenses users to consume content 116 (e.g., view and/or listen to presentations of content 116) on a limited basis. Examples of content provider 104 may include, but are not limited to, traditional movie and/or television studios, online media studios, digital media retailers, streaming media providers (e.g., subscription and/or pay-per-view services), educational or governmental entities, etc.

Device 102A may comprise at least CD module 106A and BI module 108A. Devices 102B . . . n may also comprise CD modules 106B . . . n and BI modules 108B . . . n, respectively. In general, CD modules 106A . . . n may be responsible for managing the interaction between devices 102A . . . n and content provider 104. BI modules 108A . . . n may comprise resources (e.g., sensors) for sensing biometric data 110 from users of devices 102A . . . n. As referenced herein, biometric data 110 may comprise data usable for identifying a human being based on bodily characteristics of the human being. In an example of operation, CD module 106A in device 102A may cause BI module 108A to sense biometric data 110 from a user of device 102A, and may then provide initial configuration data 112 to content provider 104 based on biometric data 110. Initial configuration data 112 may vary depending on how content provider licenses content to users. For example, content provider 104 may maintain a list of registered users that are able to purchase content from content provider 104. In such an instance initial configuration data 112 may comprise a request to register the user including at least biometric data 110 to associate with the user's account. Alternatively, content provider 104 may simply allow a user to purchase content 116 without first requiring a user account. Initial configuration data 112 may then include, for example, purchasing data and biometric data 110 and to associate with content 116, allowing the user to simply claim content 116 from content provider 104 based on biometric data 110 (e.g., when desired for consumption). In one embodiment, authentication data 114 generated based on biometric data 110 may be used to enhance or replace an existing association, such as with authentication data based on device identification. For example, an initial authentication with a user's device based on a device identification may be associated with (or may be replaced by) authentication data 114. In this way, device ID may be used to make an initial purchase of content 116 (e.g., when the purchasing device does not have biometric sensing available or does not have an appropriate form of biometric sensing for use with content provider 104), and then later content 116 may be associated with the user based on authentication data 114 being generated (e.g., based on CD module 106A causing BI module 108A to sensing biometric data 110).

The operations illustrated in FIG. 1 in regard to devices 102B . . . n deal with retrieving already purchased content 116 from content provider 104. Using device 102B as an example, activity occurring in device 102B may trigger CD module 106B to retrieve content 116 from content provider 104. Activities for triggering content retrieval may include, for example, a user activating a content presentation application in device 102B, accessing a website related to content provider 104, etc. CD module 106B may then trigger biometric module 108B to sense biometric data 110 from the user (e.g., the user who purchased content 116). Biometric data 110 may then be provided to CD module 106B for formulating authentication data 106B. In one embodiment, CD module 106B may formulate a key for use in authenticating the user based on biometric data 110, the key being incorporated within authentication data 114. It may also be possible for authentication data 114 to include information identifying content 116 (e.g., to select content 116 from a variety of purchased content), payment information (e.g., if not content 116 is not already purchased), etc. Upon receiving authentication data 114, content provider 104 may authenticate the user and transmit content 116 corresponding to the user authentication. Content 116 may then be presented by device 102A to the user (e.g., text, images and/or video may be displayed, sound and/or motion may be generated, etc.).

It is important to note that, consistent with the present disclosure, devices 102A . . . n may be interchangeable depending on, for example, their configuration. In particular, device 102A is not specialized only for performing operations related to initial configuration, while devices 102B . . . n are not specialized only for content presentation. At least one advantage that may be realized from this interchangeability is that a license for consuming content 116 may be obtained (e.g., purchased) using device 102A (e.g., a desktop computer), and content 116 may then be consumed using any of devices 102A . . . n (e.g., a smart phone, a laptop computer, a tablet computer, etc.). Thus, the user can enjoy content 116 on any device that is at least able to sense biometric data 110 while still operating in a manner consistent with the DRM of content 116. This may be considered a substantial improvement over existing DRM schemes that base authentication on device identification. While device identification may provide a level of security that satisfies the concerns of content provider 104, this limitation severely restricts how content 116 may be consumed, may negatively impact the experience of the user, and thus, may limit the profitability of content 116 for content provider 104.

Figure 2:
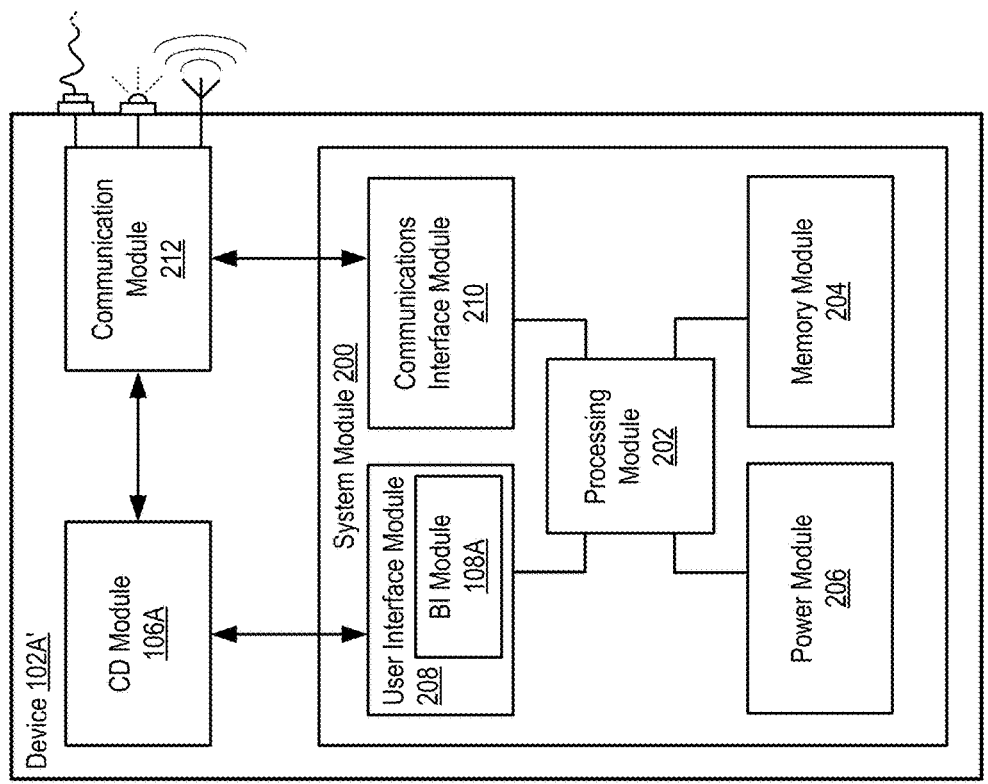
FIG. 2 illustrates an example device configuration in accordance with at least one embodiment of the present disclosure.

FIG. 2 illustrates an example configuration for a device in accordance with at least one embodiment of the present disclosure. In particular, device 102A' may be capable of performing example functionality such as disclosed in FIG. 1. However, device 102A' is meant only as an example of equipment usable in embodiments consistent with the present disclosure, and is not meant to limit these various embodiments to any particular manner of implementation. While only device 102A' is described in FIG. 2, the disclosed configuration may also be applicable to any/all of devices 102B . . . n (e.g., based on their interchangeability).

Device 102A' may comprise system module 200 to manage device operations. System module 200 may include, for example, processing module 202, memory module 204, power module 206, user interface module 114' and communication interface module 208. Device 102A' may also include at least communication module 210 and CD module 106A. While communication module 210 and CD module 106A have been shown separately from system module 200, the example implementation of device 102A' has been provided merely for the sake of explanation. Some or all of the functionality associated with communication module 210 and/or CD module 106A may also be incorporated within system module 200.

In device 102A', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102A'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102A'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory to hold information during the operation of device 102A' such as, for example, static RAM (SRAM) or dynamic RAM (DRAM). ROM may comprise memories utilizing a Basic Input/output System (BIOS) or Unified Extensible Firmware Interface (UEFI) for performing boot operations, programmable memories such as, for example, electronic programmable ROMs (EPROMS), Flash, etc. Memory module 202 may also comprise magnetic memories including, for example, floppy disks, fixed/removable hard drives, etc., electronic memories including, for example, solid state flash memory (e.g., embedded multimedia card (eMMC), etc.), removable cards/sticks (e.g., micro storage devices (uSD), USB, etc.), optical memories including, for example, compact disc ROM (CD-ROM), digital video disc (DVD), etc.

Power module 206 may include internal power sources (e.g., a battery, fuel cell, etc.) and/or external power sources (e.g., electromechanical or solar generation, power grid, etc.), and related circuitry configured to supply device 102A' with the energy needed to operate. User interface module 114' may include equipment and/or software to allow users to interact with device 102A' such as, for example, various input mechanisms (e.g., microphones, switches, buttons, knobs, keyboards, speakers, touch-sensitive surfaces, one or more sensors configured to capture images, video and/or to sense proximity, distance, motion, gestures, orientation, etc.) and various output mechanisms (e.g., speakers, displays, lighted/flashing indicators, electromechanical components for vibration, motion, etc.). The above example equipment associated with user interface module 114' may be incorporated within device 102A' and/or may be coupled to device 102A' via a wired or wireless communication medium. In one embodiment, user interface module 208 may comprise equipment usable in accordance with functionality performed by BI module 108A. For example, a touch sensor may be employed to sense a user's fingerprint, a camera may be used for carrying out facial recognition, retina scanning, etc., a microphone may be used in voice identification, etc.

Communication interface module 210 may be configured to manage packet routing and other control functions for communication module 212, which may include resources configured to support wired and/or wireless communications. In some instances, device 102A' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or communication via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the embodiment illustrated in FIG. 2, CD module 106A may interact with at least communication module 212 and user interface module 208. For example, CD module 106A may cause BI module 108A in user interface module 208 to capture biometric data 110, and may then cause communication module 212 to transmit initial configuration data 112 and/or authentication data 114 to content provider 104. In addition, CD module 106A may further receive delivery of content 116 via communication module 212, and may provide content 116 to user interface module 208 for presentation. CD module 106A may also interact with user interface module 208 and/or communication module 212 to initiate other activities such as, for example, transactions allowing users to purchase content 116 from content provider 104.

In one embodiment, CD module 106A and/or BI module 108A may comprise secure hardware and/or software to guard against unauthorized access to content 116 (e.g., to avoid biometric data 110 and/or authentication data 114 from being accessed by an unauthorized user). For example, CD modules 106A . . . n and/or BI modules 108A . . . n may be composed using hardware/software protected at the operating system (OS) privilege level. Example security provisions may include password protection, data encryption, etc. However, at least one issue with OS-privilege level security is that it may be vulnerable to attacks originating from higher privilege levels in device 102A. For example, viruses, worms, malware, etc. operating at the kernel privilege level may be able to overcome OS level security precautions.

In another embodiment, a trusted execution environment (TEE) in device 102A may be employed to secure CD module 106A and/or BI module 108A. A TEE may be a secure workspace in which known-good programs may execute, confidential information may be stored in a secure manner, etc. In general, a TEE may comprise a set of computing resources that are secure such that programs executing within the TEE, and any data associated with the executing programs, are isolated. The programs/data cannot be interfered with or observed during program execution with the exception that the program may be started or stopped and the associated data may be inserted or deleted. The insertion of data may be unobserved, and thus not interfered with, and data leaving the TEE may be released in a controlled manner. In one example implementation, the TEE may utilize Software Guard Extensions (SGX) technology developed by the Intel Corporation. SGX may provide a secure and hardware-encrypted computation and storage area inside of the system memory, the contents of which cannot be deciphered by privileged code or even through the application of hardware probes to memory bus. When the TEE is protected using SGX, embodiments consistent with the present disclosure make it impossible for an intruder to decipher the contents of the TEE. Protected data cannot be observed outside of SGX, and thus, is inaccessible outside of SGX.

In an example implementation wherein the TEE resides within SGX, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. In this way malware can't tamper with the program without also altering its verifiable measurement, and also cannot spoof the signature because the signing key is secure with the program's author. Thus, the software may not be read, written to or altered by any malware. Moreover, data may also be protected in the TEE. For example, known-good programs in the TEE may encrypt data such as keys, passwords, licenses, etc. so that only verified good programs may decrypt this information. It may also be possible to use more than one TEE. The use of a plurality of TEEs may improve security in that if a TEE is compromised the security of the remaining individual TEEs remains intact.

FIG. 3 illustrates an example of interaction between a CD module and BI module in accordance with at least one embodiment of the present disclosure. While only CD module 106A and BI module 108A' are illustrated in FIG. 3, the example interaction may apply to any of devices 102A . . . n. At least once during interaction between device 102A and content provider 104, CD module 106A may cause BI module 108A' to provide data concerning the biometric sensing available in device 102A. In response, biometric may report that device 102A is able to perform, for example, fingerprint scanning 300, finger vein scanning 302, retina scanning 304, iris scanning 306, voice recognition 308 and/or facial recognition 310. The resources used to perform the above example biometric sensing may be incorporated within device 102A, may be coupled to device 102A, may be shared (e.g., retina scanning, iris scanning and facial recognition may be handled by the same image capture device), etc.

CD module 106A may then select some or all of the biometric sensing identified by BI module 108A' for use with content provider 104. As shown at 312, fingerprint scanning 300, finger vein scanning 302, retina scanning 304 and voice recognition 308 were selected by CD module 106A. Different content providers 104 may each approve only certain forms of biometric sensing. Only some forms of biometric sensing may be selected for use with a content provider 104 because, for example, some forms of biometric sensing may be more accurate, reliable, etc. than others, content provider 104 may only be able to process certain types of biometric sensing, etc. In one embodiment, the selected forms of biometric sensing may also be ranked in order of preference by content provider 104. A user of device 102A may then choose from amongst the selected forms of biometric sensing during authentication. For example, an application, web page or other user interface may be presented to the user listing the forms of biometric sensing approved for use with content provider 104. The listing presented to the user may also change based on the abilities of the particular device 102A . . . n (e.g., device 102A may comprise a fingerprint scanner, which may be omitted in device 102B that instead includes a finger vein scanner). An approved form of biometric sensing may then be selected for authentication (e.g., as shown by fingerprint scanning 300 being highlighted).

FIG. 4 illustrates example operations for a content protection system using biometric identification in accordance with at least one embodiment of the present disclosure. Content retrieval may be triggered in operation 400. For example, a user may activate an application related to content presentation in a device, may access a webpage corresponding to a content provider, may be triggered automatically by a subsystem in the device (e.g., a user interface module), etc. Biometric data may be sensed from a user in operation 402 (e.g., a CD module in the device may cause a BI module in the device to sense the biometric data). For example, a user may select a form of biometric sensing from a list of biometric sensors approved for use with the content provider, and the selected form of biometric sensing may then generate the biometric data based on scanning the user. In operation 404, the CD module may then generate authentication data (e.g., comprising at least a key) based on the biometric data, and may proceed to transmit the authentication data to the content provider. A determination may be made in operation 406 as to whether the user can be authenticated using the authentication data. For example, the determination may be based on a response received from the content provider indicating whether the user has been authenticated based on the authentication data. If in operation 406 it is determined that the user has been authenticated, then in operation 408 a determination may be made as to whether the user has purchased the content (e.g., which may also be based on a response from the content provider). Operation 408 may be optional in that in some embodiments users are only authenticated when content has been purchased (e.g., user authentication data is associated with the content at the time of purchase). In an alternative configuration users may have authentication data associated with accounts at the content provider, and thus, content may still have to be purchased prior to retrieval. If in operation 408 it is determined that the content has been purchased, then in operation 410 the content may be retrieved. Alternatively, if it is determined in operation 408 that the content has not yet been purchased, then in operation 412 the user may be allowed to purchase the content which may then be retrieved in operation 410.

If in operation 406 it is determined that the user was not authenticated based on the authentication data provided to the content provider from the device, then in operation 414 a further determination may be made as to whether to register the user as a new user. If in operation 414 it is determined that the user should be registered as a new user, then in operation 412 the authentication data of new user may be retained by the content provider and the new user may be allowed to purchase the content in operation 412, wherein the authentication data of the new user may be associated with any content that is purchased. If in operation 414 it is determined that the user is not to be registered as a new user, then in operation 416 the content may not be retrieved (e.g., and the user may be informed that the authentication failed). Optionally, the process may return to operation 402 to reattempt the retrieval of the content by reinitiating user authentication.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a content protection system using biometric authentication. In general, a user may be authenticated using sensed biometric data prior to receiving content from a content provider. An example device may comprise a biometric identification (BI) module and a content delivery (CD) module. The CD module may cause the BI module to sense biometric data from a user of the device. Authentication data may be generated based on the biometric data. In one embodiment, the authentication data may comprise a key generated from the biometric data. The authentication data may then be sent to the content provider, and upon authentication, the content provider may deliver the content to the device. The CD module may also be able to register new users with the content provider and/or allow users to purchase content not already licensed to the user.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a content protection system using biometric authentication, as provided below.

Example 1

According to this example there is provided a device configured for use in a content protection system. The device may comprise a communication module to at least transmit authentication data to, and receive content from, a content provider, a biometric identification (BI) module to sense biometric data and a content delivery (CD) module to cause the BI module to sense the biometric data from a user in response to a request to retrieve the content from the content provider, generate the authentication data based on the biometric data, cause the communication module to transmit the authentication data to the content provider for authentication and receive the content from the content provider via the communication module based on the authentication.

Example 2

This example includes the elements of example 1, wherein the content provider is outside of the device, the content provider comprising at least one computing device accessible via a wide-area network.

Example 3

This example includes the elements of example 2, wherein the wide-area network is the Internet.

Example 4

This example includes the elements of any of examples 1 to 3, wherein the BI module is internal to the device or at least coupled to the device via the communication module.

Example 5

This example includes the elements of any of examples 1 to 3, wherein the CD module comprises at least one application verified as safe by a trusted execution environment (TEE) in the device, the TEE including at least a secure memory space accessible to only applications verified as safe by the TEE.

Example 6

This example includes the elements of any of examples 1 to 3, wherein the CD module is further to determine biometric sensors that are available in association with the BI module.

Example 7

This example includes the elements of example 6, wherein the biometric sensors comprise at least one of a fingerprint reader, a finger vein sensor, an image capture device configured to perform at least one of retina scanning, iris scanning or face recognition or a microphone configured to perform at least voice recognition.

Example 8

This example includes the elements of example 6, wherein the CD module is further to determine at least one preferred biometric sensor for use with the content provider based on the biometric sensors that were determined to be available in association with the BI module.

Example 9

This example includes the elements of example 8, wherein the CD module is further to cause the device to notify the user of the at least one preferred biometric sensor.

Example 10

This example includes the elements of any of examples 1 to 3, wherein the CD module being to generate the authentication data comprises the CD module being to generate a key for authenticating the user based on the biometric data, the authentication data including at least the key.

Example 11

This example includes the elements of any of examples 1 to 3, wherein the CD module is further to determine if the user is registered with the content provider, and if it is determined that the user is not registered with the content provider, cause the content provider to register the user based on the authentication data.

Example 12

This example includes the elements of example 11, wherein the CD module being to cause the content provider to register the user based on the authentication data comprises the CD module being to cause the content provider to associate the authentication data with data identifying the device or replace the data identifying the device with the authentication data.

Example 13

This example includes the elements of example 12, wherein the data identifying the device is encoded in firmware within the device at the time of manufacture.

Example 14

This example includes the elements of any of examples 1 to 3, wherein the CD module is further to determine if the user has purchased the content, if it is determined that the user has not purchased the content, provide a user interface in the device allowing the user to purchase the content and cause the content provider to associate the authentication data with the purchased content.

Example 15

This example includes the elements of example 14, wherein the content provider is to individually associate the purchased content with the authentication data.

Example 16

This example includes the elements of example 14, wherein the content provider is to associate the purchased content with an account, the account being associated with the authentication data.

Example 17

This example includes the elements of any of examples 1 to 3, wherein the CD module is further to determine biometric sensors that are available in association with the BI module and determine at least one preferred biometric sensor for use with the content provider based on the biometric sensors that were determined to be available in association with the BI module.

Example 18

According to this example there is provided a method for content protection. The method may comprise causing biometric data to be sensed from a user by a device in response to a request to retrieve content from a content provider, generating authentication data based on the biometric data, causing the authentication data to be transmitted from the device to the content provider for authentication and receiving the content at the device from the content provider based on the authentication.

Example 19

This example includes the elements of example 18, wherein the content provider is outside of the device, the content provider comprising at least one computing device accessible via a wide-area network.

Example 20

This example includes the elements of any of examples 18 to 19, and further comprises determining biometric sensors that are available.

Example 21

This example includes the elements of example 20, wherein the biometric sensors comprise at least one of a fingerprint reader, a finder vein sensor, an image capture device configured to perform at least one of retina scanning, iris scanning or face recognition or a microphone configured to perform at least voice recognition.

Example 22

This example includes the elements of example 20, and further comprises determining at least one preferred biometric sensor for use with the content provider based on the biometric sensors that were determined to be available.

Example 23

This example includes the elements of example 22, and further comprises causing the device to notify the user of the at least one preferred biometric sensor.

Example 24

This example includes the elements of any of examples 18 to 19, wherein generating the authentication data comprises generating a key for authenticating the user based on the biometric data, the authentication data including at least the key.

Example 25

This example includes the elements of any of examples 18 to 19, and further comprises determining if the user is registered with the content provider, and if it is determined that the user is not registered with the content provider, causing the content provider to register the user based on the authentication data.

Example 26

This example includes the elements of example 25, wherein causing the content provider to register the user based on the authentication data comprises causing the content provider to associate the authentication data with data identifying the device or replace the data identifying the device with the authentication data.

Example 27

This example includes the elements of example 26, wherein the data identifying the device is encoded in firmware within the device at the time of manufacture.

Example 28

This example includes the elements of any of examples 18 to 19, and further comprises determining if the user has purchased the content, if it is determined that the user has not purchased the content, providing a user interface in the device allowing the user to purchase the content and causing the content provider to associate the authentication data with the purchased content.

Example 29

This example includes the elements of example 28, wherein the purchased content is individually associated with the authentication data by the content provider.

Example 30

This example includes the elements of example 28, wherein the purchased content is associated with an account by the content provider, the account being associated with the authentication data.

Example 31

This example includes the elements of any of examples 18 to 19, and further comprises determining biometric sensors that are available and determining at least one preferred biometric sensor for use with the content provider based on the biometric sensors that were determined to be available.

Example 32

According to this example there is provided a system including at least one device, the system being arranged to perform the method of any of the above examples 18 to 31.

Example 33

According to this example there is provided a chipset arranged to perform the method of any of the above examples 18 to 31.

Example 34

According to this example there is provided at least one machine readable medium comprising a plurality of instructions that, in response to be being executed on a computing device, cause the computing device to carry out the method according to any of the above examples 18 to 31.

Example 35

According to this example there is provided a device configured for a content protection system using biometric authentication, the device being arranged to perform the method of any of the above examples 18 to 31.

Example 36

According to this example there is provided a system for content protection. The system may comprise means for causing biometric data to be sensed from a user by a device in response to a request to retrieve content from a content provider, means for generating authentication data based on the biometric data, means for causing the authentication data to be transmitted from the device to the content provider for authentication and means for receiving the content at the device from the content provider based on the authentication.

Example 37

This example includes the elements of example 36, and further comprises means for determining biometric sensors that are available.

Example 38

This example includes the elements of example 37, and further comprises means for determining at least one preferred biometric sensor for use with the content provider based on the biometric sensors that were determined to be available.

Example 39

This example includes the elements of any of examples 36 to 38, wherein the means for generating the authentication data comprise means for generating a key for authenticating the user based on the biometric data, the authentication data including at least the key.

Example 40

This example includes the elements of any of examples 36 to 38, and further comprises means for determining if the user is registered with the content provider and means for, if it is determined that the user is not registered with the content provider, causing the content provider to register the user based on the authentication data.

Example 41

This example includes the elements of example 40, wherein the means for causing the content provider to register the user based on the authentication data comprise means for causing the content provider to associate the authentication data with data identifying the device or replace the data identifying the device with the authentication data.

Example 42

This example includes the elements of any of examples 36 to 38, and further comprises means for determining if the user has purchased the content, means for, if it is determined that the user has not purchased the content, providing a user interface in the device allowing the user to purchase the content and means for causing the content provider to associate the authentication data with the purchased content.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device for secured distribution of multi-media content in a content protection system, comprising:
communication circuitry to at least transmit authentication data to, and receive multi-media content from, a multi-media content provider, wherein the multi-media content consists of video multi-media content and/or audio multi-media content;
biometric identification circuitry to sense biometric data from a user of the device;
content delivery circuitry to:
cause the biometric identification circuitry to sense the biometric data from the user in response to a request to retrieve the multi-media content from the multi-media content provider;
generate the authentication data based on the biometric data;
cause the communication circuitry to transmit the authentication data to the multi-media content provider to authenticate an account for the user with the multi-media content provider to enable receipt of the multi-media content by the device from the multi-media content provider, wherein the account for the user is created from a second device; and
receive the multi-media content from the multi-media content provider via the communication circuitry based on authentication of the account, in response to transmission and verification of the biometric data, to reduce a likelihood of unauthorized distribution of the multi-media content and to enable digital rights management of the multi-media content; and
system circuitry to provide a trusted execution environment to protect against unauthorized access to the biometric data,
wherein the content delivery circuitry comprises at least one application verified as safe by the trusted execution environment in the device, the trusted execution environment including at least a secure memory space accessible to only applications verified as safe by the trusted execution environment, wherein the trusted execution environment includes a hardware-encrypted computation and storage area within memory circuitry.

2. The device of claim 1, wherein the multi-media content provider is remote from the device, the multi-media content provider comprising at least one computing device accessible via a wide-area network.

3. The device of claim 1, wherein the biometric identification circuitry is internal to the device or at least coupled to the device via the communication circuitry.

4. The device of claim 1, wherein the content delivery circuitry is further to determine biometric sensors that are available in association with the biometric identification circuitry.

5. The device of claim 4, wherein the content delivery circuitry is further to determine at least one preferred biometric sensor for use with the multi-media content provider based on the biometric sensors that were determined to be available in association with the biometric identification circuitry.

6. The device of claim 1, wherein the content delivery circuitry being to generate the authentication data comprises the content delivery circuitry being to generate a key for authenticating the user based on the biometric data, the authentication data including at least the key, wherein the trusted execution environment to protect against unauthorized access to the authentication data.

7. The device of claim 1, wherein the content delivery circuitry is further to:
determine if the user is registered with the multi-media content provider; and
if it is determined that the user is not registered with the content provider, cause the multi-media content provider to register the user based on the authentication data.

8. The device of claim 7, wherein the content delivery circuitry being to cause the multi-media content provider to register the user based on the authentication data comprises the content delivery circuitry being to cause the multi-media content provider to associate the authentication data with data identifying the device or replace the data identifying the device with the authentication data.

9. The device of claim 1, wherein the content delivery circuitry is further to:
determine if the user has purchased the multi-media content;
if it is determined that the user has not purchased the multi-media content, provide a user interface in the device allowing the user to purchase the multi-media content; and
cause the multi-media content provider to associate the authentication data with the purchased multi-media content.

10. A method for securing distribution of multi-media content from a multi-media content provider to a plurality of devices, comprising:
causing biometric data to be sensed from a user by a device in response to a request to retrieve multi-media content from a multi-media content provider, wherein the multi-media content consists of video multi-media content and/or audio multi-media content;
generating authentication data based on the biometric data;
causing the authentication data to be transmitted from the device to the multi-media content provider to authenticate an account for the user with the multi-media content provider to enable receipt of the multi-media content by the device from the multi-media content provider, wherein the account for the user is initiated from a second device;
receiving the multi-media content at the device from the multi-media content provider based on authentication of the account, in response to transmission and verification of the biometric data, to reduce a likelihood of unauthorized distribution of the multi-media content and to enable digital rights management of the multi-media content;
providing a trusted execution environment to protect against unauthorized access to the biometric data; and
verifying at least one application as safe by the trusted execution environment, wherein the trusted execution environment includes at least a secure memory space accessible to applications verified as safe by the trusted execution environment, wherein the trusted execution environment includes a hardware-encrypted computation and storage area within memory circuitry.

11. The method of claim 10, further comprising:
determining biometric sensors that are available.

12. The method of claim 11, further comprising:
determining at least one preferred biometric sensor for use with the multi-media content provider based on the biometric sensors that were determined to be available.

13. The method of claim 10, wherein generating the authentication data comprises generating a key for authenticating the user based on the biometric data, the authentication data including at least the key.

14. The method of claim 10, further comprising:
determining if the user is registered with the multi-media content provider; and
if it is determined that the user is not registered with the multi-media content provider, causing the multi-media content provider to register the user based on the authentication data.

15. The method of claim 14, wherein causing the multi-media content provider to register the user based on the authentication data comprises causing the multi-media content provider to associate the authentication data with data identifying the device or replace the data identifying the device with the authentication data.

16. The method of claim 10, further comprising:
determining if the user has purchased the multi-media content;
if it is determined that the user has not purchased the multi-media content, providing a user interface in the device allowing the user to purchase the multi-media content; and
causing the multi-media content provider to associate the authentication data with the purchased multi-media content.

17. At least one non-transitory machine-readable storage medium having stored thereon, individually or in combination, instructions that when executed by one or more processors result in the following operations for securing distribution of multi-media content from a multi-media content provider to a plurality of devices, comprising:
causing biometric data to be sensed from a user by a device in response to a request to retrieve multi-media content from a multi-media content provider, wherein the multi-media content consists of video multi-media content and/or audio multi-media content;
generating authentication data based on the biometric data;
causing the authentication data to be transmitted from the device to the multi-media content provider to authenticate an account for the user with the multi-media content provider to enable receipt of the multi-media content by the device from the multi-media content provider, wherein the account for the user is initiated from a second device;

receiving the multi-media content at the device from the multi-media content provider based on authentication of the account, in response to transmission and verification of the biometric data, to reduce a likelihood of unauthorized distribution of the multi-media content and to enable digital rights management of the multi-media content;

providing a trusted execution environment to protect against unauthorized access to the biometric data; and verifying at least one application as safe by the trusted execution environment, wherein the trusted execution environment includes at least a secure memory space accessible to applications verified as safe by the trusted execution environment, wherein the trusted execution environment includes a hardware-encrypted computation and storage area within memory circuitry.

18. The at least one non-transitory machine-readable storage medium of claim 17, further comprising instructions that when executed by one or more processors result in the following operations comprising:

determining biometric sensors that are available.

19. The at least one non-transitory machine-readable storage medium of claim 18, further comprising instructions that when executed by one or more processors result in the following operations comprising:

determining at least one preferred biometric sensor for use with the multi-media content provider based on the biometric sensors that were determined to be available.

20. The at least one non-transitory machine-readable storage medium of claim 17, wherein generating the authentication data comprises generating a key for authenticating the user based on the biometric data, the authentication data including at least the key.

21. The at least one non-transitory machine-readable storage medium of claim 17, further comprising instructions that when executed by one or more processors result in the following operations comprising:

determining if the user is registered with the multi-media content provider; and if it is determined that the user is not registered with the multi-media content provider, causing the multi-media content provider to register the user based on the authentication data.

22. The at least one non-transitory machine-readable storage medium of claim 21, wherein causing the multi-media content provider to register the user based on the authentication data comprises causing the multi-media content provider to replace the data identifying the device with the authentication data.

23. The at least one non-transitory machine-readable storage medium of claim 17, further comprising instructions that when executed by one or more processors result in the following operations comprising:

determining if the user has purchased the multi-media content;

if it is determined that the user has not purchased the multi-media content, providing a user interface in the device allowing the user to purchase the multi-media content; and causing the multi-media content provider to associate the authentication data with the purchased multi-media content.

* * * * *